United States Patent
Paczkowski et al.

(10) Patent No.: US 10,282,719 B1
(45) Date of Patent: May 7, 2019

(54) SECURE AND TRUSTED DEVICE-BASED BILLING AND CHARGING PROCESS USING PRIVILEGE FOR NETWORK PROXY AUTHENTICATION AND AUDIT

(71) Applicant: Sprint Communications Company L.P., Overland Park, KS (US)

(72) Inventors: Lyle W. Paczkowski, Mission Hills, KS (US); Joao "Tex" Teixeira, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 533 days.

(21) Appl. No.: 14/939,887

(22) Filed: Nov. 12, 2015

(51) Int. Cl.
| | |
|---|---|
| G06Q 20/14 | (2012.01) |
| H04L 29/08 | (2006.01) |
| H04M 15/00 | (2006.01) |
| H04L 29/06 | (2006.01) |

(52) U.S. Cl.
CPC .......... G06Q 20/145 (2013.01); H04L 67/22 (2013.01); H04L 67/42 (2013.01); H04M 15/43 (2013.01); H04M 15/48 (2013.01); H04M 15/60 (2013.01); H04M 15/67 (2013.01)

(58) Field of Classification Search
CPC ....... G06Q 20/145; H04L 67/22; H04L 67/42; H04M 15/43
USPC ............... 705/34, 35, 40, 26.1; 726/7, 1, 28; 709/217; 455/410; 713/172
See application file for complete search history.

(56) References Cited

U.S. PATENT DOCUMENTS

| | | |
|---|---|---|
| 5,303,378 A | 4/1994 | Cohen |
| 5,321,735 A | 6/1994 | Breeden et al. |
| 5,764,889 A | 6/1998 | Ault et al. |
| 5,796,952 A | 8/1998 | Davis et al. |
| 5,825,876 A | 10/1998 | Peterson, Jr. |
| 6,131,024 A | 10/2000 | Boltz |
| 6,177,860 B1 | 1/2001 | Cromer et al. |

(Continued)

FOREIGN PATENT DOCUMENTS

| | | |
|---|---|---|
| EP | 1933252 A1 | 5/2016 |
| GB | 2456754 A | 7/2009 |

(Continued)

OTHER PUBLICATIONS

FAIPP Pre-Interview Communication dated Mar. 24, 2015, U.S. Appl. No. 13/964,112, filed Aug. 12, 2013.

(Continued)

*Primary Examiner* — Vanel Frenel

(57) ABSTRACT

A user equipment with a primary identifier and a secondary identifier. The user equipment comprises a witness application stored in the memory, that when executed by the processor in a trusted security zone, wherein the trusted security zone provides hardware assisted trust, transmits a message comprising the logs of the communication service consumption to a server in a network of a service provider associated with the user equipment using a trusted end-to-end communication channel, wherein the logs are translated by the server to a format compatible with a billing data store supported by a billing server, wherein the translated logs are transmitted to the billing data store, whereby a bill is created for each of the primary identifier and the secondary identifier by the billing server accessing the billing data store.

20 Claims, 7 Drawing Sheets

(56) References Cited

U.S. PATENT DOCUMENTS

| | | |
|---|---|---|
| 6,219,712 B1 | 4/2001 | Mann et al. |
| 6,222,463 B1 | 4/2001 | Rai |
| 6,363,150 B1 | 3/2002 | Bhagavath et al. |
| 6,389,403 B1 | 5/2002 | Dorak, Jr. |
| 6,434,561 B1 | 8/2002 | Durst, Jr. et al. |
| 6,477,180 B1 | 11/2002 | Aggarwal et al. |
| 6,507,869 B1 | 1/2003 | Franke et al. |
| 6,507,904 B1 | 1/2003 | Ellison et al. |
| 6,614,893 B1 | 9/2003 | Paiz |
| 6,651,171 B1 | 11/2003 | England et al. |
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,023,979 B1 | 4/2006 | Wu et al. |
| 7,043,241 B1 | 5/2006 | Sladek et al. |
| 7,069,234 B1 | 6/2006 | Cornelius et al. |
| 7,127,541 B2 | 10/2006 | Govindarajulu et al. |
| 7,366,806 B2 | 4/2008 | Milenkovic et al. |
| 7,386,275 B2 | 6/2008 | Pirzada et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,716,720 B1 | 5/2010 | Marek et al. |
| 7,761,558 B1 | 7/2010 | Jindal et al. |
| 7,849,309 B1 | 12/2010 | Brown |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,155,642 B2 * | 4/2012 | Russell ............... G01S 5/0252 455/432.1 |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,295,811 B1 | 10/2012 | Gailloux et al. |
| 8,298,295 B2 | 10/2012 | Aissi et al. |
| 8,316,237 B1 | 11/2012 | Felsher et al. |
| 8,332,895 B2 | 12/2012 | Nathan et al. |
| 8,332,953 B2 | 12/2012 | Lemieux et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,442,588 B2 | 5/2013 | Sims et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,498,572 B1 | 7/2013 | Schooley et al. |
| 8,504,097 B1 | 8/2013 | Cope et al. |
| 8,542,833 B2 | 9/2013 | Devol et al. |
| 8,566,183 B1 | 10/2013 | Bonar et al. |
| 8,588,749 B1 | 11/2013 | Sadhvani et al. |
| 8,590,012 B2 | 11/2013 | Roy et al. |
| 8,631,247 B2 | 1/2014 | OLoughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,699,998 B2 | 4/2014 | Sprigg et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,826,015 B2 | 9/2014 | Lakshminarayanan et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,868,898 B1 | 10/2014 | Van Hoof |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,177,157 B2 | 11/2015 | Binder |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2 | 2/2016 | McCann et al. |
| 9,268,959 B2 | 2/2016 | Paczkowski et al. |
| 9,282,898 B2 | 3/2016 | McRoberts et al. |
| 9,324,016 B1 | 4/2016 | Cordes et al. |
| 9,374,363 B1 | 6/2016 | Paczkowski et al. |
| 9,384,498 B1 | 7/2016 | Benz et al. |
| 9,443,088 B1 | 9/2016 | Bye et al. |
| 9,454,723 B1 | 9/2016 | Cordes et al. |
| 9,473,945 B1 | 10/2016 | Marquardt et al. |
| 9,560,519 B1 | 1/2017 | McCracken, Jr. et al. |
| 9,613,208 B1 | 4/2017 | Paczkowski et al. |
| 9,712,999 B1 | 7/2017 | Cordes et al. |
| 9,779,232 B1 | 10/2017 | Paczkowski et al. |
| 9,811,672 B2 | 11/2017 | Bye et al. |
| 9,817,992 B1 | 11/2017 | Paczkowski et al. |
| 9,819,679 B1 | 11/2017 | Bertz et al. |
| 9,838,392 B2 | 12/2017 | Sainio et al. |
| 9,838,868 B1 | 12/2017 | Nelson et al. |
| 9,838,869 B1 | 12/2017 | Bye et al. |
| 9,906,958 B2 | 2/2018 | Katzer et al. |
| 9,949,304 B1 | 4/2018 | McCracken et al. |
| 10,154,019 B2 | 12/2018 | McRoberts et al. |
| 2001/0041591 A1 | 11/2001 | Carroll |
| 2002/0002468 A1 | 1/2002 | Spagna et al. |
| 2002/0007456 A1 | 1/2002 | Peinado et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery |
| 2002/0184325 A1 | 12/2002 | Killcommons et al. |
| 2002/0194361 A1 | 12/2002 | Itoh et al. |
| 2002/0194496 A1 | 12/2002 | Griffin et al. |

(56) References Cited

U.S. PATENT DOCUMENTS

| | | |
|---|---|---|
| 2003/0045273 A1 | 3/2003 | Pyhalammi et al. |
| 2003/0092435 A1 | 5/2003 | Boivin |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0182347 A1 | 9/2003 | Dehlinger |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0036572 A1 | 2/2004 | Forster |
| 2004/0043788 A1 | 3/2004 | Mittal |
| 2004/0064351 A1 | 4/2004 | Mikurak |
| 2004/0093274 A1 | 5/2004 | Vanska et al. |
| 2004/0137890 A1 | 7/2004 | Kalke |
| 2004/0158840 A1 | 8/2004 | Rothman et al. |
| 2004/0202319 A1 | 10/2004 | Hussain et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0030898 A1 | 2/2005 | Furlong et al. |
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1 | 5/2005 | Smith et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1 | 7/2005 | Milenkovic et al. |
| 2005/0153741 A1 | 7/2005 | Chen et al. |
| 2005/0164680 A1 | 7/2005 | Gould |
| 2005/0181796 A1 | 8/2005 | Kumar et al. |
| 2005/0200478 A1 | 9/2005 | Koch et al. |
| 2005/0226468 A1 | 10/2005 | Deshpande et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1 | 11/2005 | Melick et al. |
| 2005/0272445 A1 | 12/2005 | Zellner |
| 2005/0280557 A1 | 12/2005 | Jha et al. |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1 | 7/2006 | Cardina et al. |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0239131 A1 | 10/2006 | Nathan et al. |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0093246 A1* | 4/2007 | Adamany ............ H01L 23/3107 455/435.1 |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0156850 A1 | 7/2007 | Corrion |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0188306 A1 | 8/2007 | Tethrake et al. |
| 2007/0192652 A1 | 8/2007 | Kao et al. |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0261112 A1 | 11/2007 | Todd et al. |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1 | 1/2008 | Giordano et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0068166 A1 | 3/2008 | Lauper et al. |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1 | 5/2008 | Jatschka et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0160997 A1* | 7/2008 | Kim .................... H04W 8/02 455/433 |
| 2008/0162361 A1 | 7/2008 | Sklovsky et al. |
| 2008/0162637 A1* | 7/2008 | Adamczyk ............ H04L 51/043 709/204 |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2008/0274716 A1* | 11/2008 | Fok ..................... H04W 12/08 455/410 |
| 2008/0281953 A1 | 11/2008 | Blaisdell |
| 2008/0304640 A1 | 12/2008 | Reilly |
| 2008/0320577 A1 | 12/2008 | Larduinat |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1 | 5/2009 | Gangi |
| 2009/0141713 A1 | 6/2009 | Beverly |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |

(56) References Cited

U.S. PATENT DOCUMENTS

| | | |
|---|---|---|
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0215385 A1 | 8/2009 | Waters et al. |
| 2009/0224919 A1 | 9/2009 | Angell et al. |
| 2009/0227290 A1 | 9/2009 | Chien |
| 2009/0248445 A1 | 10/2009 | Harnick |
| 2009/0271321 A1 | 10/2009 | Stafford |
| 2009/0275364 A1 | 11/2009 | Morel et al. |
| 2009/0281947 A1 | 11/2009 | Erel |
| 2009/0289764 A1 | 11/2009 | Chiu |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0064341 A1 | 3/2010 | Aldera |
| 2010/0066486 A1 | 3/2010 | Park et al. |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0121156 A1 | 5/2010 | Yoo |
| 2010/0125512 A1 | 5/2010 | Jones et al. |
| 2010/0125904 A1 | 5/2010 | Nice et al. |
| 2010/0127868 A1 | 5/2010 | Hamilton et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153513 A1 | 6/2010 | Zahran |
| 2010/0153721 A1 | 6/2010 | Mellqvist |
| 2010/0162028 A1 | 6/2010 | Frank et al. |
| 2010/0167755 A1* | 7/2010 | Kim ............... H04W 48/18 455/456.1 |
| 2010/0190469 A1 | 7/2010 | Vanderveen et al. |
| 2010/0191613 A1* | 7/2010 | Raleigh ............ G06Q 10/06375 705/26.1 |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1 | 9/2011 | Rutigliano et al. |
| 2011/0225293 A1* | 9/2011 | Rathod ............. G06F 17/30867 709/224 |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258443 A1 | 10/2011 | Barry |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0108295 A1 | 5/2012 | Schell et al. |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0166806 A1 | 6/2012 | Zhang et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1 | 8/2012 | Arponen et al. |
| 2012/0220269 A1 | 8/2012 | Feng |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |

(56) References Cited

U.S. PATENT DOCUMENTS

| | | |
|---|---|---|
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0274444 A1 | 11/2012 | Micali et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1 | 1/2013 | Dinan |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0061055 A1* | 3/2013 | Schibuk ............... G06Q 20/223 713/172 |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0086695 A1 | 4/2013 | Lakshminarayanan |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0260791 A1 | 10/2013 | Malinovskiy et al. |
| 2013/0262264 A1 | 10/2013 | Karstoft |
| 2013/0263212 A1 | 10/2013 | Faltyn et al. |
| 2013/0290359 A1 | 10/2013 | Eronen et al. |
| 2013/0290709 A1 | 10/2013 | Muppidi et al. |
| 2013/0310003 A1 | 11/2013 | Sadhvani et al. |
| 2013/0313314 A1 | 11/2013 | Jeng et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0052562 A1 | 2/2014 | Oliveira et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | OConnor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0143826 A1 | 5/2014 | Sharp et al. |
| 2014/0155025 A1 | 6/2014 | Parker et al. |
| 2014/0166745 A1 | 6/2014 | Graef et al. |
| 2014/0173747 A1 | 6/2014 | Govindaraju |
| 2014/0188412 A1 | 7/2014 | Mahajan et al. |
| 2014/0188738 A1 | 7/2014 | Huxharn |
| 2014/0200051 A1 | 7/2014 | Liu |
| 2014/0215196 A1 | 7/2014 | Berlin |
| 2014/0222955 A1* | 8/2014 | Islam .................. H04L 63/0876 709/217 |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1 | 9/2014 | Lynam et al. |
| 2014/0279556 A1 | 9/2014 | Priebatsch et al. |
| 2014/0279558 A1 | 9/2014 | Kadi et al. |
| 2014/0298026 A1 | 10/2014 | Isozaki et al. |
| 2014/0331279 A1* | 11/2014 | Aissi ..................... G06F 21/53 726/1 |
| 2015/0032976 A1 | 1/2015 | Chapier et al. |
| 2015/0106805 A1 | 4/2015 | Melander et al. |
| 2015/0172928 A1 | 6/2015 | Katzer et al. |
| 2015/0358455 A1 | 12/2015 | Mosher et al. |
| 2016/0004876 A1 | 1/2016 | Bye et al. |
| 2016/0142396 A1 | 5/2016 | McRoberts et al. |
| 2016/0150478 A1 | 5/2016 | Li et al. |
| 2016/0323731 A1* | 11/2016 | Mohammed .......... H04M 15/70 |
| 2017/0026840 A1 | 1/2017 | Eyal |
| 2017/0180395 A1 | 6/2017 | Stransky-Heilkron |

FOREIGN PATENT DOCUMENTS

| | | |
|---|---|---|
| JP | 6171245 B2 | 8/2017 |
| JP | 6332766 B2 | 5/2018 |
| WO | WO2011025433 A1 | 3/2011 |
| WO | WO2012064171 A1 | 5/2012 |
| WO | WO2012085593 A1 | 6/2012 |
| WO | WO2013170228 A2 | 11/2013 |
| WO | WO2014004590 A2 | 1/2014 |
| WO | WO2014018575 A2 | 1/2014 |
| WO | WO2014025687 A2 | 2/2014 |
| WO | WO2014158431 A1 | 10/2014 |

OTHER PUBLICATIONS

Notice of Allowance dated Aug. 3, 2015, U.S. Appl. No. 13/964,112, filed Aug. 12, 2013.
Office Action dated Aug. 25, 2016, U.S. Appl. No. 13/860,338, filed Apr. 10, 2013.
Final Office Action dated Mar. 9, 2017, U.S. Appl. No. 13/860,338, filed Apr. 10, 2013.
Advisory Action dated Jun. 1, 2017, U.S. Appl. No. 13/860,338, filed Apr. 10, 2013.
Notice of Allowance dated Jul. 28, 2017, U.S. Appl. No. 13/860,338, filed Apr. 10, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
Notice of Allowance dated Aug. 24, 2016, U.S. Appl. No. 13/912,190, filed Jun. 6, 2013.
FAIPP Pre-Interview Communication dated Oct. 12, 2017, U.S. Appl. No. 15/365,934, filed Nov. 30, 2016.
Notice of Allowance dated Dec. 7, 2017, U.S. Appl. No. 15/365,934, filed Nov. 30, 2016.
FAIPP Pre-Interview Communication dated Apr. 15, 2015, U.S. Appl. No. 14/085,474, filed Nov. 20, 2013.
Notice of Allowance dated May 29, 2015, U.S. Appl. No. 14/085,474, filed Nov. 20, 2013.
FAIPP Pre-Interview Communication dated Feb. 4, 2015, U.S. Appl. No. 14/075,663, filed Nov. 8, 2013.
First Action Interview Office Action dated Apr. 10, 2015, U.S. Appl. No. 14/075,663, filed Nov. 8, 2013.

(56) References Cited

OTHER PUBLICATIONS

Notice of Allowance dated Jul. 1, 2015, U.S. Appl. No. 14/075,663, filed Nov. 8, 2013.
FAIPP Pre-Interview Communication dated Feb. 24, 2015, U.S. Appl. No. 14/163,047, filed Jan. 24, 2014.
Notice of Allowance dated Apr. 9, 2015, U.S. Appl. No. 14/163,047, filed Jan. 24, 2014.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Apr. 27, 2017, Application U.S. Appl. No. 14/606,011, filed Jan. 26, 2015.
Notice of Allowance dated Aug. 7, 2017, U.S. Appl. No. 14/606,011, filed Jan. 26, 2015.
FAIPP Pre-Interview Communication dated Aug. 8, 2016, U.S. Appl. No. 14/596,218, filed Jan. 14, 2015.
FAIPP Office Action dated Apr. 5, 2017, U.S. Appl. No. 14/596,218, filed Jan. 14, 2015.
Notice of Allowance dated May 30, 2017, U.S. Appl. No. 14/596,218, filed Jan. 14, 2015.
FAIPP Pre-Interview Communication dated Nov. 18, 2015, U.S. Appl. No. 14/681,077, filed Apr. 7, 2015.
First Action Interview Office Action dated Mar. 28, 2016, U.S. Appl. No. 14/681,077, filed Apr. 7, 2015.
Notice of Allowance dated Jun. 15, 2016, U.S. Appl. No. 14/681,077, filed Apr. 7, 2015.
FAIPP Pre-Interview Communication dated May 9, 2017, U.S. Appl. No. 14/853,492, filed Sep. 14, 2015.
Notice of Allowance dated Jul. 7, 2017, U.S. Appl. No. 14/853,492, filed Sep. 14, 2015.
Office Action dated Mar. 8, 2017, U.S. Appl. No. 14/947,257, filed Nov. 20, 2015.
Notice of Allowance dated Jul. 24, 2017, U.S. Appl. No. 14/947,257, filed Nov. 20, 2015.
FAIPP Pre-Interview Communication dated Aug. 5, 2015, U.S. Appl. No. 13/857,141, filed Apr. 4, 2013.
Notice of Allowance dated Dec. 17, 2015, U.S. Appl. No. 13/857,141, filed Apr. 4, 2013.
FAIPP Pre-Interview Communication dated Oct. 5, 2016, U.S. Appl. No. 15/069,921, filed Mar. 14, 2016.
Notice of Allowance dated Mar. 10, 2017, U.S. Appl. No. 15/069,921, filed Mar. 14, 2016.
Restriction Requirement dated Jan. 5, 2015, U.S. Appl. No. 13/857,139, filed Apr. 4, 2013.
FAIPP Pre-Interview Communication dated Jun. 2, 2015, U.S. Appl. No. 13/857,139, filed Apr. 4, 2013.
Office Action dated Nov. 19, 2015, U.S. Appl. No. 13/857,139, filed Apr. 4, 2013.
Notice of Allowance dated May 26, 2016, U.S. Appl. No. 13/857,139, filed Apr. 4, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
FAIPP Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj,com/article/SB10001424052748703421204576329253050634700.html.

Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Notice of Allowance dated Sep. 21, 2015, U.S. Appl. No. 14/148,714, filed Jan. 6, 2014.
European Examination Report dated Mar. 3, 2016, EPC Application Serial No. 13822974.5, filed on Jan. 8, 2015.
Japanese Decision for Grant dated Jun. 6, 2017, JP Application Serial No. 2015-524404.
FAIPP Pre-Interview Communication dated Aug. 4, 2014, U.S. Appl. No. 13/844,357, filed Mar. 15, 2013.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Final Office Action dated Apr. 7, 2015, U.S. Appl. No. 13/844,145, filed Mar. 15, 2013.
Notice of Allowance dated Jul. 6, 2015, U.S. Appl. No. 13/844,145, filed Mar. 15, 2013.
FAIPP Pre-Interview Communication dated Mar. 1, 2016, U.S. Appl. No. 13/863,376, filed Apr. 15, 2013.
Notice of Allowance dated May 2, 2016, U.S. Appl. No. 13/863,376, filed Apr. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Feb. 12, 2015, U.S. Appl. No. 14/066,661, filed Oct. 29, 2013.
Notice of Allowance dated Jul. 6, 2015, U.S. Appl. No. 14/066,661, filed Oct. 29, 2013.
Restriction Requirement dated Aug. 14, 2014, U.S. Appl. No. 13/594,777, filed Aug. 25, 2012.
Notice of Allowance dated Dec. 3, 2014, U.S. Appl. No. 13/594,777, filed Aug. 25, 2012.
Notice of Allowance dated Nov. 9, 2015, U.S. Appl. No. 14/659,614, filed Mar. 17, 2015.
FAIPP Pre-Interview Communication dated Jul. 17, 2014, U.S. Appl. No. 13/594,778, filed Aug. 25, 2012.
Notice of Allowance dated Sep. 19, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
First Action Interview Office Action dated Dec. 3, 2014, U.S. Appl. No. 13/594,779, filed Aug. 25, 2012.
Notice of Allowance dated Aug. 14, 2015, U.S. Appl. No. 13/594,779, filed Aug. 25, 2012.
Office Action dated May 5, 2014, U.S. Appl. No. 13/786,450, filed Mar. 5, 2013.
Final Office Action dated Nov. 7, 2014, U.S. Appl. No. 13/786,450, filed Mar. 5, 2013.
Notice of Allowance dated Feb. 26, 2015, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
First Action Interview Office Action dated Apr. 7, 2015, U.S. Appl. No. 13/802,404, filed Mar. 13, 2013.
Final Office Action dated Aug. 27, 2015, U.S. Appl. No. 13/802,404, filed Mar. 13, 2013.
Advisory Action dated Nov. 16, 2015, U.S. Appl. No. 13/802,404, filed Mar. 13, 2013.
Office Action dated May 17, 2016, U.S. Appl. No. 13/802,404, filed Mar. 13, 2013.

(56) References Cited

OTHER PUBLICATIONS

Notice of Allowance dated Nov. 18, 2016, U.S. Appl. No. 13/802,404, filed Mar. 13, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
FAIPP Pre-Interview Communication dated Mar. 26, 2015, U.S. Appl. No. 13/939,175, filed Jul. 10, 2013.
Notice of Allowance dated Jul. 7, 2015, U.S. Appl. No. 13/939,175, filed Jul. 10, 2013.
FAIPP Pre-Interview Communication dated Oct. 29, 2014, U.S. Appl. No. 13/844,282, filed Mar. 15, 2013.
Final Office Action dated Mar. 24, 2015, U.S. Appl. No. 13/844,282, filed Mar. 15, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Feb. 26, 2016, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
European Examination Report dated Jun. 1, 2016, EPC Application Serial No. 14775613.4, filed on Jul. 8, 2015.
European Examination Report dated Feb. 14, 2017, EPC Application Serial No. 14775613.4, filed on Jul. 8, 2015.
European Examination Report dated Sep. 20, 2017, EPC Application Serial No. 14775613.4, filed on Jul. 8, 2015.
Japanese Office Action dated Jan. 16, 2018, Japanese Application Serial No. 2-2016-500275, filed on Jun. 25, 2015.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed on May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
Office Action dated Aug. 29, 2014, U.S. Appl. No. 13/470,203, filed May 11, 2012.
Notice of Allowance dated Dec. 22, 2014, U.S. Appl. No. 13/470,203, filed May 11, 2012.
FAIPP Pre-Interview Communication dated Jul. 2, 2015, U.S. Appl. No. 14/632,850, filed Feb. 26, 2015.
Final Office Action dated Nov. 6, 2015, U.S. Appl. No. 14/632,850, filed Feb. 26, 2015.
Advisory Action dated Jan. 29, 2016, U.S. Appl. No. 14/632,850, filed Feb. 26, 2015.
Examiners Answer dated Nov. 16, 2016, U.S. Appl. No. 14/632,850, filed Feb. 26, 2015.
Decision on Appeal dated Sep. 15, 2017, U.S. Appl. No. 14/632,850, filed Feb. 26, 2015.
Notice of Allowance dated Oct. 18, 2017, U.S. Appl. No. 14/632,850, filed Feb. 26, 2015.
FAIPP Pre-Interview Communication dated May 12, 2014, U.S. Appl. No. 13/294,177, filed Nov. 11, 2011.
Notice of Allowance dated Oct. 8, 2014, U.S. Appl. No. 13/294,177, filed Nov. 11, 2011.
FAIPP Pre-Interview Communication dated Mar. 25, 2015, U.S. Appl. No. 13/532,588, filed Jun. 25, 2012.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
FAIPP Pre-Interview Communication dated Sep. 25, 2014, U.S. Appl. No. 13/533,969, filed Jun. 27, 2012.
Supplemental Notice of Allowance dated Nov. 16, 2015, U.S. Appl. No. 13/532,588, filed Jun. 25, 2012.
Notice of Allowance dated Feb. 5, 2015, U.S. Appl. No. 13/533,969, filed Jun. 27, 2012.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Office Action dated Dec. 15, 2014, U.S. Appl. No. 13/571,348, filed Aug. 10, 2012.
Notice of Allowance dated Jun. 17, 2015, U.S. Appl. No. 13/571,348, filed Aug. 10, 2012.
FAIPP Pre-Interview Communication dated Mar. 21, 2017, U.S. Appl. No. 14/855,364, filed Sep. 15, 2015.
Notice of Allowance dated Jul. 6, 2017, U.S. Appl. No. 14/855,364, filed Sep. 15, 2015.
Restriction Requirement dated Jan. 2, 2015, U.S. Appl. No. 13/762,319, filed Feb. 7, 2013.
FAIPP Pre-Interview Communication dated Mar. 10, 2015, U.S. Appl. No. 13/762,319, filed Feb. 7, 2013.
Notice of Allowance dated Jun. 9, 2015, U.S. Appl. No. 13/762,319, filed Feb. 7, 2013.
Notice of Allowance dated Aug. 30, 2013, U.S. Appl. No. 13/540,437, filed Jul. 2, 2012.
FAIPP Pre-Interview Communication dated May 21, 2015, U.S. Appl. No. 14/090,667, filed Nov. 26, 2013.
Notice of Allowance dated Aug. 4, 2015, U.S. Appl. No. 14/090,667, filed Nov. 26, 2013.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance dated Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
Foreign Communication from a Related Counterpart—International Search Report and Written Opinion, dated Dec. 2, 2013, PCT/US13/40673, filed on May 10, 2013.
Foreign Communication from a Related Counterpart—International Preliminary Report on Patentability, dated Nov. 20, 2014, PCT/US13/40673, filed on May 10, 2013.

(56) References Cited

OTHER PUBLICATIONS

Giesecke & Devrient, "The OTA Platform in the World of LTE", Jan. 2011, http://www.gi-de.com/gd_media/media/en/documents/brochures/mobile_security_2/cste_1/OTA-and-LTE.pdf.

Pesonen, Lauri, "Development of Mobile Payment Ecosystem—NFC Based Payment Services", Aug. 27, 2008.

Foreign Communication from a Related Counterpart—International Search Report and Written Opinion, dated Feb. 1, 2014, PCT/US13/47729, filed on Jun. 25, 2013.

Foreign Communication from a Related Counterpart—International Preliminary Report on Patentability, dated Jan. 8, 2015, PCT/US13/47729, filed on Jun. 25, 2013.

Foreign Communication from a Related Counterpart—International Search Report and Written Opinion, dated Apr. 22, 2014, PCT/US13/53617, filed on Aug. 5, 2013.

Foreign Communication from a Related Counterpart—International Preliminary Report on Patentability, dated Feb. 19, 2015, PCT/US13/53617, filed on Aug. 5, 2013.

Foreign Communication from a Related Counterpart—International Search Report and Written Opinion, dated Feb. 1, 2014, PCT/US13/51750, filed on Jul. 24, 2013.

Foreign Communication from a Related Counterpart—International Preliminary Report on Patentability, dated Feb. 5, 2015, PCT/US13/51750, filed on Jul. 24, 2013.

Foreign Communication from a Related Counterpart—International Search Report and Written Opinion, dated Jul. 11, 2014, PCT/US14/16651, filed on Feb. 16, 2014.

Foreign Communication from a Related Counterpart—International Preliminary Report on Patentability, dated Sep. 24, 2015, PCT/US14/16651, filed on Feb. 16, 2014.

Ahmed, Farid, et al., "Correlation-based Watermarking Method for Imagine Authentication Applications", Society of Photo-Optical Instrumentation Engineers, Feb. 17, 2004, pp. 1834-1838.

Perrig, Adrian, et al., "Spins: Security Protocols for Sensor Networks," ACM, Sep. 2002, vol. 8, pp. 521-534.

Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.

Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.

Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.

Dietrich, Kurt, et al., " Implementation Aspects of Mobile and Embedded Trusted Computing," Institute for Applied Information Processing and Communications, Trusted Computing Interaction Conference, 2009.

Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003.

Hamdare, Safa, et al., "Securing SMS Based One Time Password Technique from Man in the Middle Attach," IJETT, vol. 11 Issue 3, May 2014.

Twin Connect—"User Guide for Windows"; 30 pages; dated 2013.

WiseGEEK,"What is a USB Dongle?," http://www.wisegeek.com/what-is-a-usb-dongle.htm, four pages, dated Jul. 25, 2017. (53400 FAIPC).

McCracken, Billy Gene, Jr., et al. "Mobile Communication Device Profound Identity Brokering Framework", filed Nov. 30, 2016, U.S. Appl. No. 15/365,934.

Paczkowski, Lyle W., et al., "System and Method for Secure USIM Wireless Network Access," filed Sep. 29, 2017, U.S. Appl. No. 15/719,813.

Marquardt, Ronald R., et al., "Data Link Layer Trust Signaling in Communication Network," filed Jul. 11, 2017, U.S. Appl. No. 15/646,842.

Japanese Decision for Grant dated Apr. 3, 2018, Japanese Application Serial No. 2-2016-500275, filed on Jun. 25, 2015.

Office Action dated Jun. 11, 2018, U.S. Appl. No. 15/719,813, filed Sep. 29, 2017.

Notice of Allowance dated Aug. 15, 2018, U.S. Appl. No. 15/005,123, filed Jan. 25, 2016.

Notice of Allowance dated Feb. 6, 2019, U.S. Appl. No. 15/719,813, filed on Sep. 29, 2017 [IDF 11059A (4300-642011].

FAIPP Pre-Interview Communication dated Feb. 11, 2019, U.S. Appl. No. 15/646,842, filed Jul. 11, 2017 [IDF 11637 (4300-71500)].

* cited by examiner

SECURE AND TRUSTED DEVICE-BASED BILLING AND CHARGING PROCESS USING PRIVILEGE FOR NETWORK PROXY AUTHENTICATION AND AUDIT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the past, communication service providers (wireline, wireless, broadband cable, satellite) and other companies competed through product differentiation and price points. Today, with products highly commoditized and price differences negligible, the remaining differentiator is how well a company can deliver a customer experience that is personalized, rewarding, and meets customer needs. Billing is a key operations support system (OSS)/business support system (BSS) entity to allow for creative pricing packages.

SUMMARY

In an embodiment, a user equipment with a primary identifier and a secondary identifier is disclosed. The user equipment comprises a memory, a processor, and a witness application stored in the memory. When executed by the processor in a trusted security zone, wherein the trusted security zone provides hardware assisted trust, the witness application monitors communication service consumption associated with each of the primary identifier and the secondary identifier of the user equipment and stores a plurality of logs of communication service consumption differentiated by identifier in the trusted security zone. The witness application further transmits a message comprising the logs of the communication service consumption to a server in a network of a service provider associated with the user equipment using a trusted end-to-end communication channel, wherein the logs are translated by the server to a format compatible with a billing data store supported by a billing server, wherein the translated logs are transmitted to the billing data store, whereby a bill is created for each of the primary identifier and the secondary identifier by the billing server accessing the billing data store.

In an embodiment, a method of collecting communication service consumption information associated with a primary identifier and a secondary identifier of a user equipment is disclosed. The method comprises monitoring, by a witness application that executes in a trusted security zone of the UE, communication service consumption associated with each of the primary identifier and the secondary identifier of the UE, wherein the trusted security zone provides hardware assisted trust, and storing a plurality of logs of communication service consumption differentiated by identifier in the trusted security zone. The method further comprises transmitting a message comprising the logs of the communication service consumption over a trusted end-to-end communication channel to a server in a network of a service provider associated with the UE, wherein the logs are translated by the server to a format compatible with a billing data store supported by a billing server, wherein the translated logs are transmitted to the billing data store, whereby a bill is created for each of the primary identifier and the secondary identifier by the billing server accessing the billing data store.

In an embodiment, a method of collecting communication service consumption information associated with a plurality of identifiers of a user equipment is disclosed. The method comprises monitoring, by a witness application that executes in a trusted security zone of the user equipment, communication service consumption associated with the plurality of identifiers, wherein the trusted security zone provides hardware assisted trust and storing a plurality of logs of communication service consumption differentiated by identifier in a trusted security zone. The method further comprises transmitting the plurality of logs of communication service consumption to a data store via a trusted end-to-end communication channel, wherein the data store is supported by a server in a network of a service provider associated with the user equipment and receiving, by the data store, processed billing information transmitted by a billing server, wherein the billing information is processed by the billing server. The method further comprises separating, by the server, the processed billing information based on identifier and the plurality of logs of communication service consumption and creating, by the server, a bill for each of the plurality of identifiers based on the separate billing information.

In an embodiment, a method of providing wireless communication service to a user equipment (UE) is disclosed. The method comprises downloading, by a trusted application on the UE, a broker application that mediates access to a wireless network supported by a wireless communication service provider, wherein the trusted application executes in a trusted security zone of the UE, wherein the trusted security zone provides hardware assisted trust, and installing, by the broker application, a network access key into the trusted security zone of the UE for the wireless network, wherein the broker application executes in the trusted security zone. The method further comprises responsive to receiving a rejection of an attach request to roam by the UE in the wireless network, presenting, by the broker application, credentials to the wireless network, wherein the credentials comprise the network access key, validating, by a wireless communication service provider server, the network access key presented by the UE, and responsive to the network access key being validated based on the examining results, granting, by the wireless communication service provider server, network access of the wireless network to the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
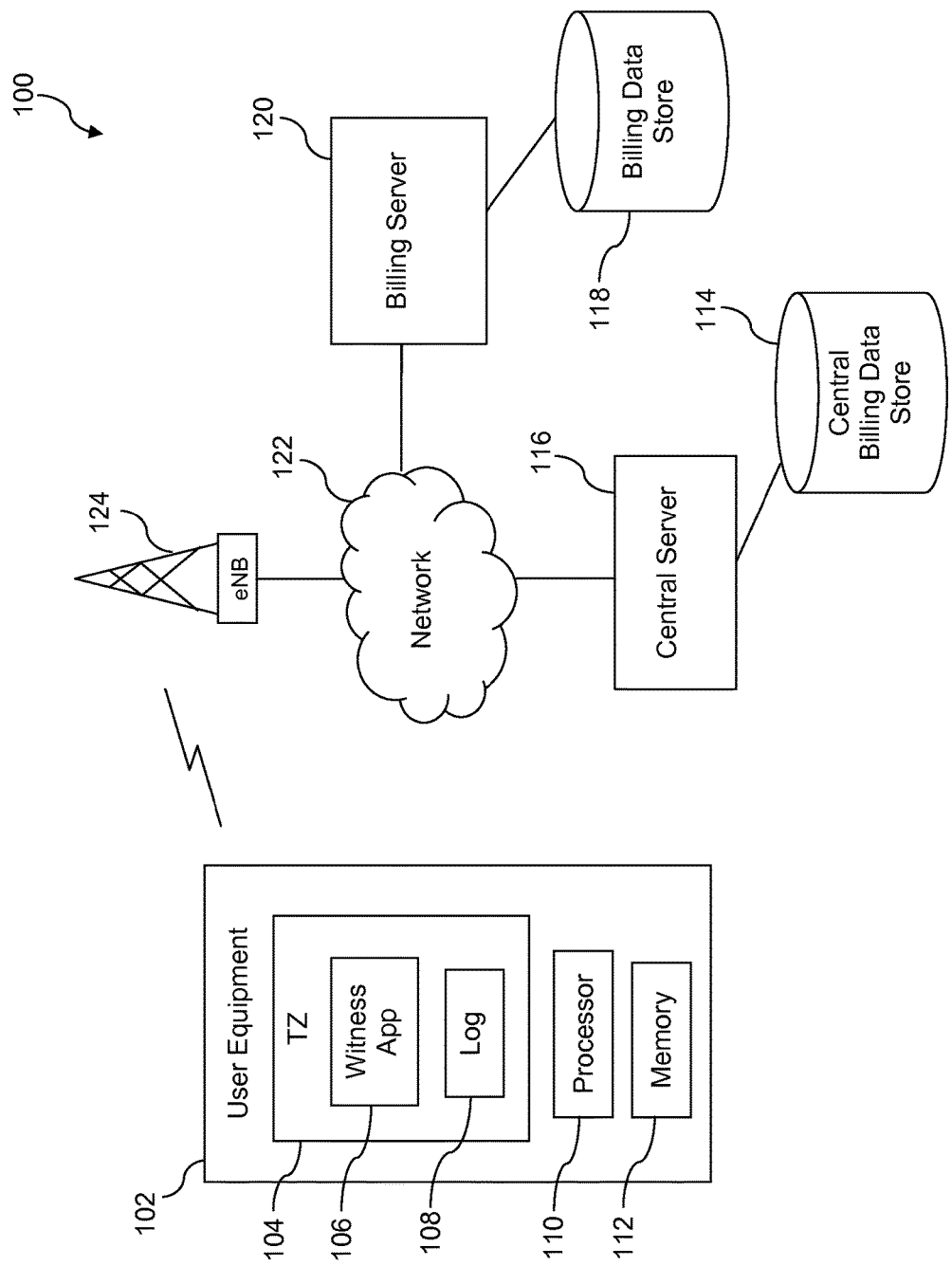
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When a communication service provider introduces new services, one issue may rise that may prevent or delay the service deployment—it is costly to modify the existing third party billing platform such as AMDOCS to add billing support for the new user devices or services. Additionally, currently there is no way to programmatically trust a user equipment to report its own usage back to the network billing platform or the third party billing platform. The user could compromise billing records on the user equipment, for instance by "rooting" the operating system and subverting the anti-fraud software. Thus, a method of securely recording and storing billing information on the user equipment and reporting the recorded billing information to a billing server through a trusted communication channel may be desirable. The present disclosure teaches a system and method for a secure and trusted device-based billing and charging system and process using new trusted security zone privilege for network proxy authentication and audit.

For example, a witness application may be stored in a trusted security zone in a memory of a user equipment. The trusted security zone may provide hardware assisted trust. The witness application executed in the trusted security zone may monitor communication service consumption associated with a plurality of identifiers of the user equipment. The identifier may be one or more of a phone number, a mobile equipment identifier (MEID), a uniform resource identifier (URI), or a uniform resource locator (URL), or another type of identifier. The plurality of identifiers may comprise at least a primary identifier and a secondary identifier. Alternatively, the identifiers may be separated into one primary identifier and secondary identifiers—identifiers except the primary identifier may be referred to as secondary identifiers. The secondary identifier may be configured to the user equipment in the trusted security zone.

Different identifiers may be associated with different types of communication services or network traffic. For example, one identifier may be associated with personal usage and another with business usage; one identifier may be associated with secure data usage and another with non-secure data usage, etc. The witness application may store a plurality of logs of communication service consumption differentiated by identifier in the trusted security zone.

The billing server, part of the internal system of a communication service provider associated with the user equipment, may monitor and record network activities or communication service consumption related to billing or charging. The network activities or communication service consumption related to billing or charging may be called billing information. In an embodiment, the billing information may be a usage record, a call detail record (CDR), or a data detail record (DDR) in which the information for these is accumulated by an application of the billing server. The billing server may process the billing information to generate processed billing information and transmit the processed billing information to a data store. The data store may be supported by a central server in a network of the communication service provider.

The witness application may transmit the logs of communication service consumption to the data store or the central server via a trusted end-to-end communication channel. As described in more detail below, trusted computation and/or trusted communication is based on hardware assisted security that reduces the ability of nefarious software or corrupt devices to write, read, or otherwise access trusted memory, trusted processing, or trusted messages. For further details about establishing trusted end-to-end communication links, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Since the logs of communication service consumption have been stored in the trusted security zone of the user equipment and are now transmitted to the data store or the central server via the trusted end-to-end communication channel, the logs of communication service consumption stay intact without being tampered with by unauthorized entities until they reach the data store or the central server.

So far, the processed billing information from the billing server has not been separated based on different identifiers. When the data store receives processed billing information transmitted by the billing server, the central server associated with the communication service provider may separate the processed billing information based on identifier and the logs of communication service consumption received from the witness application. Note that network traffic monitored at the user equipment may be different from the network traffic monitored on network. For example, the start time, the end time, and the duration of the communication session monitored at the user equipment may be different from the start time, the end time, and the duration of the same communication session monitored on network. Thus, communication service consumption records from the user equipment may be different from the billing information from the billing server. The processed billing information with a specific start timestamp, end timestamp, and/or duration may be determined to be for the same communication session as a communication service consumption record with an approximately matching start timestamp, end timestamp, and/or duration from the user equipment. The central server associated with the communication service provider may create a different bill for each of the different identifiers of the same user equipment based on the separate billing information. This is not performed at the third billing platform such as the AMDOCS platform but instead performed by the central server post processing, i.e., after the billing information has been processed by the billing server.

Alternatively, the witness application may still transmit logs of the communication service consumption to the billing server, for example in a message comprising the logs of the communication service consumption over a trusted end-to-end communication channel to the billing server or a billing data store that is supported by the billing server while the logs may be marked or labeled by the witness application in a way that the logs may be ignored by the billing server. In other words, the billing server may not process the logs but may forward the logs to the next entity along the path of the billing process. For instance, the logs may be labeled by the witness application with "rate 0". The logs may then be forwarded by the billing server to the central server associated with the communication service provider or the data store supported by the central server. The logs may be translated by the central server to a format compatible with the billing data store supported by the billing server. The translated logs may now be transmitted to the billing data store. A different bill may be created for each of the different identifiers such as the primary identifier and the secondary identifier by the billing server accessing the billing data store.

The message comprising the logs of the communication service consumption may be transmitted to the central server using the trusted end-to-end communication channel periodically or asynchronously. When the message is transmitted to the central server periodically, the message may be transmitted every day, every week, every month, every two months, or at some other interval. Alternatively, the message is transmitted to the central server every time that communication services are used.

Non-network related activity may also be monitored by the witness application, for example for billing purposes. The logs of the non-network related activity may be transmitted in the message comprising the logs of the communication service consumption to the central server using the trusted end-to-end communication channel.

Under some circumstances, a user equipment may be determined to be unprovisioned for wireless communication service. For example, when the user equipment can only provide an enhanced Node B (eNB), a base transceiver station (BTS), or a cell tower with its equipment identity but not a network access key, the user equipment may be determined to be unprovisioned. When a user equipment can provide the eNB with an equipment identifier and an expired subscriber account that had been assigned by a wireless communication service provider, the user equipment may be determined to be unprovisioned. Additionally, when a user equipment can provide an equipment identifier and a subscriber account assigned by a home service provider other than the wireless communication service provider that maintains the eNB but is denied roaming with the wireless communication service provider by its own home service provider, the mobile communication device may be determined to be unprovisioned. A home service provider of a user equipment is a communication service provider the user equipment is associated with and/or is subscribed to.

The witness application or another trusted application on the user equipment may download a broker application that mediates access to a wireless network supported by a wireless communication service provider. The user equipment may be unprovisioned, for example to utilize the wireless network. The wireless communication service provider may not be the home service provider of the user equipment and the wireless network may be different from a home network associated with the home service provider of the user equipment. In other words, the wireless network may be a foreign network. A foreign network is any network that is different from the network which is operated by the home service provider to which the user equipment is subscribed. When the user equipment is out of coverage of home network but is in the coverage of a different network—a foreign network—it may receive roaming wireless coverage from the different network.

For example, a user may choose not to roam with the wireless network through the user equipment's home service provider but instead to roam with the wireless network directly—the latter may be more cost effective. In the first case, the wireless communication service provider may bill the home service provider for the roaming service first, and the home service provider may then bill the user for the roaming service with a markup in price. In the second case, the wireless communication service provider may bill the user directly with a unit price for roaming between the unit prices the wireless communication service provider would bill the home service provider and the home service provider would bill the user. Thus, the user saves money when roaming with the wireless communication service provider directly.

The user of the user equipment may choose to download the broker application for this potential use of the wireless network. The broker application may be stored in the trusted security zone on the user equipment. When executed by the processor of the user equipment in a trusted execution environment, the broker application may perform a variety of functions related to network access request and/or grant for the wireless network. For example, the broker application may install a network access key into the trusted security zone of the UE for accessing the wireless network.

When the user equipment is in the vicinity of the wireless network, the user equipment may transmit a message such as an "attach" message through a control channel to make contact with a foreign base transceiver station or a foreign eNB that is part of the wireless network. The user equipment may then attempt to register with the wireless network so that the user equipment can roam with the wireless network through the home service provider. When the wireless network checks with the home network on whether the user equipment may roam with the wireless network, the home network may indicate that the user equipment is configured not to roam with the wireless network through the home service provider—as chosen by the user of the user equipment. Thus, the user equipment may be denied roaming with the wireless network through the home service provider. However, the foreign eNB may inquire whether a broker application has been installed on the user equipment. The user equipment may reply to the foreign eNB indicating that a broker application has been installed on the user equipment and its credentials to roam directly with the wireless network.

The broker application, for example, may mediate access to the wireless network directly with the wireless communication service provider by presenting credentials to the wireless network for access to the wireless network. The credentials may comprise the network access key that is installed and stored in the trusted security zone of the user equipment. A wireless communication service provider server from the wireless communication service provider may validate the credentials including network access key presented by the user equipment. When the network access key is validated, the wireless communication service provider server may grant network access of the wireless network to the user equipment.

Payment information may be provided by the user equipment to the wireless communication service provider via the broker application when the broker application is downloaded and/or installed on the user equipment. After the user equipment is granted access to the wireless network, communication service consumption associated with the wireless network may be monitored and stored. Furthermore, the monitored communication service consumption may be reported to the wireless communication service provider server via a trusted end-to-end communication channel.

Alternatively, instead of installing the broker application in advance, a message may pop up on the screen of the user equipment to indicate an alternative method to access the network such as to access the wireless network associated with the wireless communication service provider when the user equipment receives a denial of roaming with the wireless network through the home service provider. The denial message may be sent by a foreign eNB or a foreign server that is associated with the wireless network. The user equipment receives the denial because the user of the user equipment has chosen not to roam with the wireless network through the home service provider. The denial message may comprise a web address or link for the user equipment to download a broker application that mediates access to the wireless network. When the user chooses to download the broker application, the broker application may be downloaded by the witness application or another trusted application into the trusted security zone on the user equipment. During installation, the user may be asked for a payment method by the broker application to be associated with the wireless network service consumption.

Thus, user equipments that are unprovisioned with the wireless communication service provider or any wireless communication service provider may download the broker application to utilize the wireless network maintained by the wireless communication service provider. User equipments that were unprovisioned with the wireless communication service provider but were provisioned with some home service provider may switch to the wireless communication service provider permanently after using the wireless network temporarily through the broker application, thus creating new business opportunities for the wireless communication service provider.

An identifier database may store user equipment identifiers such as international mobile equipment identities (IMEIs). The identifier database may be a national identifier database that stores equipment identifiers of user equipments across wireless communication technologies, original equipment manufacturers, and/or wireless communication service providers. For example, user equipment identifiers of long-term evolution (LTE) devices may be stored in the identifier database when the user equipments are manufactured. Thus, when an unprovisioned user equipment requests access to the wireless network, the wireless communication service provider may recognize the user equipment by at least its equipment identifier.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The Trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the communication system 100 comprises a plurality of user equipments (UE) 102, a central server 116, a billing server 120, a central billing data store 114, and a billing data store 118. The UE 102 may alternatively be referred to in some contexts as a mobile communication device. The UE 102 may comprise a processor 110 and a memory 112. The memory 112 may comprise a trusted security zone 104. The trusted security zone 104 may comprise a witness application 106 and a plurality of logs 108.

The UE 102 may be configured to use a radio transceiver to establish a wireless communication link with an enhanced Node B (eNB) 124, and the eNB 124 may communicatively couple the UE 102 to a network 122. The eNB 124 may alternatively be referred to in some contexts as a base transceiver station (BTS) or a cell tower. The central server 116, the central billing data store 114, the billing server 120, and the billing data store 118 may also be communicatively coupled to the network 122. The network 122 may comprise any combination of private and public networks.

It is understood that the system 100 may comprise any number of UEs 102, any number of billing data stores 118, any number of billing servers 120, and any number of eNBs 124. The collectivity of eNBs 124 may be said to comprise a radio access network (RAN), in that these eNBs 124 may provide a radio communication link to the UEs 102 to provide access to the network 122. The radio transceiver of the UE 102 may communicate with the eNB 124 using any of a variety of wireless communication protocols including a code division multiple access (CDMA) wireless communication protocol, a global system for mobile communication (GSM) wireless communication protocol, a long-term evolution (LTE) wireless communication protocol, a worldwide interoperability for microwave access (WiMAX) wireless communication protocol, or another wireless communication protocol.

While a smart phone is used in the role of UE 102 in a preferred embodiment, the teachings of the present disclosure may also be extended to other network/communications capable devices such as a laptop computer, a notebook computer, a tablet computer, a smart phone, a personal digital assistant (PDA), a media player, a headset computer, a wearable computer, a game console, an Internet digital media streaming device, a television, a set top box, a portable storage device, a hotspot, a 2.5 Wi-Fi translator, an Internet of Things (IoT) device, or another network/communications capable device. In an embodiment, the UE 102 may have other components (not shown) such as a near field communication (NFC) radio transceiver, a short range radio transceiver such as a wireless local area network radio transceiver, or other components and/or devices.

The central server 116 and the central billing data store 114 may be server computers. The central server 116 and the central billing data store 114 may be located in one computer—for example a server computer, in two different computers—for example, a server computer for the central server 116 and another computer for the central billing data store 114, in multiple different computers—for example, multiple server computers for the central server 116 and other multiple computers for the central billing data store 114, or in some other combination of computers. When the central server 116 and the central billing data store 114 are not located in one computer, the central server 116 and the central billing data store 114 may share the same wired or wireless local area network. It is similar with the billing server 120 and the billing data store 118.

The witness application 106 may be stored in a trusted partition of the memory 112, for example in the trusted security zone 104 in the memory 112. When executed by the processor 110 in the trusted security zone 104, the witness application 106 may perform a variety of functionality to monitor and log communication service consumption and/or report the communication service consumption to the central server 116. In an embodiment, the UE 102 may comprise a plurality of identifiers. An identifier of the UE 102 or a wireless communication identifier may be a personal wireless communication identifier, a business wireless communication identifier, a production wireless communication identifier, a testing wireless communication identifier, wireless communication identifiers for different wireless communication providers, wireless communication identifiers for different reward membership, a wireless communication identifier for a mobile wallet, or another wireless communication identifier. For example, a personal identifier may be associated with personal wireless communication on the UE 102 and a business identifier may be associated with business wireless communication on the UE 102. The wireless communication identifier may be referred to as an identifier hereinafter. The identifier may be one of a phone number, a uniform resource identifier (URI), a uniform resource locator (URL), or another type of identifier.

The witness application 106 may monitor communication service consumption of each of the identifiers of the UE 102, store logs of communication service consumption associated with the identifiers, and/or transmit messages comprising the logs of communication service consumption to the central server 116 via a trusted end-to-end communication channel.

A trustlet may be configured and/or installed in the UE 102 to send the message to provide a higher level of security. The trustlet may be associated with a communication application. For example, the trustlet may be part of a communication application on the UE 102. An application may be partitioned into a portion comprised of instructions that need not execute in the trusted security zone 104 and a portion comprised of instructions that desirably do execute in the trusted security zone 104. The portion of instructions of an application that are desirably executed in the trusted security zone 104 may be referred to as a trustlet. A trustlet may be thought of as an extract of a complete application—an extract of the specific instructions that desirably execute in a trusted security zone 104. The portion of the application that need not execute in the trusted security zone 104 may be said to execute in the rich environment or permissive environment.

For example, the witness app 106 may monitor communication service consumption associated with each of the identifiers of the UE 102. Communication service consumption may comprise voice calls, data calls, and/or some other type of communication service consumption or network traffic. In an embodiment, one identifier may be associated with personal usage of the UE 102 or communication services and another identifier may be associated with business usage of the UE 102 or communication services. Alternatively or additionally, one identifier may be associated with secure data usage and another identifier may be associated with non-secure data usage, etc. Thus, different identifiers may be associated with different communication service accounts and may be charged differently based on logs. Among the identifiers of the UE 102, one may be a primary identifier and a second one may be a secondary identifier, etc. The secondary identifier(s) may be configured into the UE 102 via the trusted security zone and the trusted end-to-end communication channel. A service order code (SOC) may be assigned to the secondary identifier by the billing server 120.

The witness app 106 may store logs of communication service consumption associated with the identifiers of the UE 102. For example, the witness app 106 may create a log for each of the identifiers of the UE 102 and store those logs in the trusted security zone 104. The log of communication service consumption may comprise details of communication service consumption, for instance the type of communication service, volume, duration, start time, end time, frequency, and/or some other characteristic of communication service consumption associated with an identifier. Because these logs are stored in the trusted security zone 104, they cannot be tampered with. The witness app 106 may update the logs with monitored communication service consumption information.

The witness app 106 may transmit a message comprising these logs of communication service consumption to the central server 116 via a trusted end-to-end communication channel. In an embodiment, the trusted end-to-end communication infrastructure assures that the message sent from the witness app 106 to the central server 116 is processed by the trusted security zone of each communication node during each step on its way through a foreign network until it enters the network 122 which is operated by a home service provider to which the UE 102 is subscribed. A foreign network is any network that is different from the network 122 which is operated by the home service provider to which the UE 102 is subscribed. When the UE 102 is out of coverage of home network but is in the coverage of a different network—a foreign network—it may receive roaming wireless coverage from the different network. An application may be executed in a trusted security zone of the central server 116 to perform functions associated with receiving the logs of communication service consumption and processing the logs.

In a first embodiment, the witness app 106 may transmit a message comprising the logs of communication service consumption to the central server 116 via a trusted end-to-end communication channel periodically or asynchronously. For instance, the witness app 106 may transmit the message every time communication services are used, every day, every week, every month, every two months, or at some other interval.

The billing server 120, as part of the internal system of a communication service provider associated with the user equipment 102, may also monitor and record network activities or communication service consumption related to billing or charging, like in the current billing systems. The network activities or communication service consumption related to billing or charging may be called billing information. The billing information may be a usage record, a call detail record (CDR), a data detail record (DDR), or some other type of billing records in which the information for these is accumulated by an application on the user equipment 102. The billing server 120 may process the billing information to generate processed billing information and transmit the processed billing information to the central billing data store 114. The billing server 120 may transmit the processed billing information to the central billing data store 114 or the central server 116.

Alternatively, a negative call detail record that deducts from the existing call detail record to exclude billing information associated with secondary identifier(s) may be generated by the witness app 106 and the billing information associated with the secondary identifier(s) may be deducted before the existing CDR reaches the billing server 120. The billing server 120 may process the result of the subtraction to generate processed billing information. Meanwhile, the negative call detail record may also be transmitted by the witness app 106 to the central billing data store 114 or the central server 116.

When the central billing data store 114 receives processed billing information and/or the negative call detail record transmitted by the billing server 120, the central server 116 may separate the processed billing information and/or the negative call detail record based on the logs of communication service consumption received from the UE 102. Note that network traffic monitored at the UE 102 may be different from the network traffic monitored on network, and thus communication service consumption records from the UE 102 may be different from the billing information from the billing server 120. The processed billing information with a specific start timestamp, end timestamp, and/or duration may be determined to be for the same communication session as a communication service consumption record with an approximately matching start timestamp, end timestamp, and/or duration from the UE 102. The logs of communication service consumption may comprise communication service consumption details associated with individual identifiers of the UE 102 and billing information may be separated into portions corresponding to the individual identifiers. The central server 116 may generate a bill for each of the identifiers based on the separate billing information.

In a second embodiment, the witness app 106 may transmit the logs of communication service consumption over a trusted end-to-end communication channel to the billing server 120 or the billing data store 118, for example in a message. The logs may be marked or labeled by the witness app 106 in a way that the logs may be ignored by the billing server 120. In other words, the billing server 120 may not process the logs but may forward the logs to the next entity along the path of the billing process. For instance, the logs may be labeled by the witness app 106 with "rate 0" so that the billing server 120 may forward the logs to the next entity along the path of the billing process without processing the logs. The logs may then be forwarded by the billing server 120 to the central server 116 or the central billing data store 114.

The logs of communication service consumption from the UE 102 or the witness app 106 may be in a first format different from a second format that could be understood by the billing server 120. When the logs reach the central server 116 or the central billing data store 114, the logs may be translated, converted, or transcoded by the central server 116 or an application on the central server 116 into the second format that is compatible with the billing data store 118 and/or the billing server 120. The translated logs may now be transmitted by the central server 116 to the billing data store 118.

A specific service order code (SOC) may be assigned to the secondary identifier by the billing server 120 to manage or handle the translated logs of communication service consumption from the UE 102. In an embodiment, when there is more than one secondary identifier associated with the UE 102, one service order code may be assigned by the billing server 120 to each secondary identifier. This specific service order code may be different from an existing service order code that manages billing information associated with the primary identifier. The billing server 120 and the central server 116 may communicate via a mediator application programming interface (API), for example a Parlay interface. The service order code handling the billing process at the billing server 120 may be configured to ignore 0 rated data on the network side but accept the 0 rated data on the Parlay side. Accordingly, when the logs of communication service consumption with rate 0 from the UE 102 reach the billing server 120, the logs arrive on the network side, and thus the logs may be ignored—forwarded to the next entity without being processed. On the other hand, when the translated logs with rate 0 from the central server 116 reach the billing server 120, the translated logs arrive on the Parlay side, and thus the billing server 120 may process the translated logs. A bill may then be generated for each of the identifiers of the UE 102 by the billing server 120 accessing the billing data store 118.

Note that non-network related activity may also be monitored by the witness application 106 for example for billing purposes. The non-network related activity information may be transmitted in the message comprising the communication service consumption to the central server 116 using the trusted end-to-end communication channel.

Figure 2:
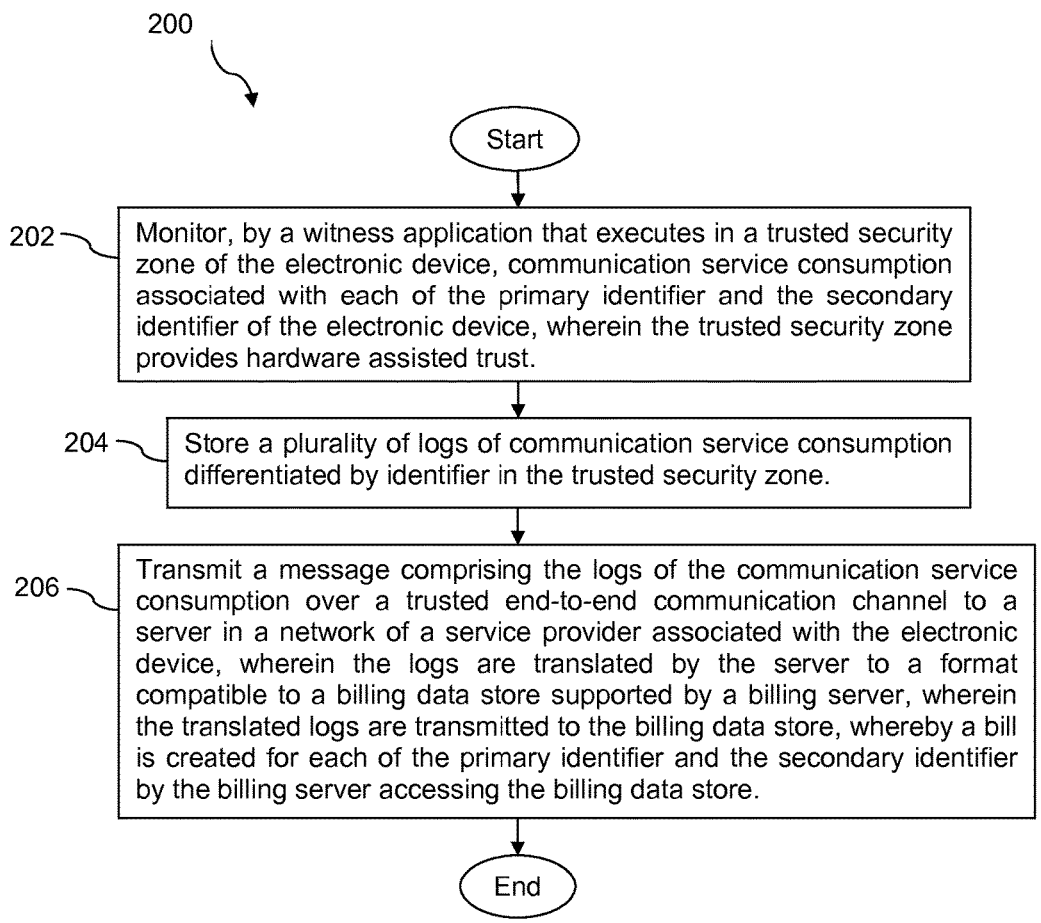
FIG. 2 is a flow chart illustrating a method according to an embodiment of the disclosure.

Turning now to FIG. 2, a method 200 is described. At block 202, communication service consumption associated with each of the primary identifier and the secondary identifier of a user equipment (UE) is monitored by a witness application that executes in a trusted security zone of the UE, wherein the trusted security zone provides hardware assisted trust. For example, as shown in FIG. 1, communication service consumption associated with each of the primary identifier and the secondary identifier(s) of the UE 102 may be monitored by the witness app 106. The witness app 106 may execute in the trusted security zone 104 of the UE 102. The trusted security zone 104 provides hardware assisted trust.

At block 204, a plurality of logs of communication service consumption differentiated by identifier are stored in the trusted security zone. For example, the logs of communication service consumption may be stored in the trusted security zone 104. The logs may be differentiated by identifier. At block 206, a message comprising the logs of the communication service consumption is transmitted over a trusted end-to-end communication channel to a server 116 in a network of a service provider associated with the UE 102, wherein the logs are translated by the central server 116 to a format compatible with a billing data store 118 supported by a billing server 120, wherein the translated logs are transmitted to the billing data store 118, whereby a bill is created for each of the primary identifier and the secondary identifier by the billing server 120 accessing the billing data store 118.

Figure 3:
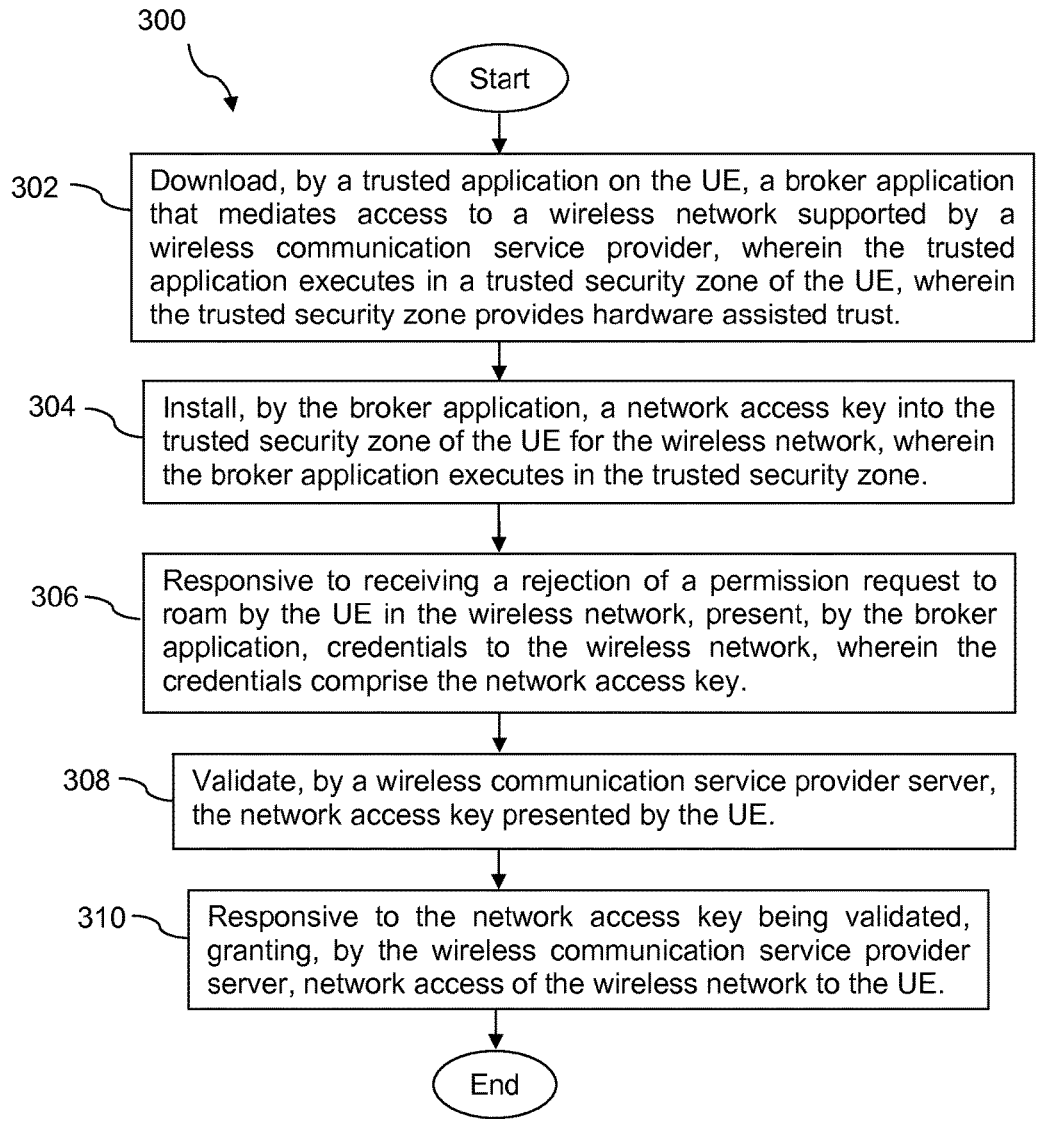
FIG. 3 is a flow chart illustrating another method according to an embodiment of the disclosure.

Turning now to FIG. 3, a method 300 is described. At block 302, a broker application that mediates access to a wireless network supported by a wireless communication service provider is downloaded by a trusted application on the UE, wherein the trusted application executes in a trusted security zone of the UE, wherein the trusted security zone provides hardware assisted trust. For example, a broker application may be downloaded by the witness application 106 or another trusted application that executes in the trusted security zone 104 on the UE 102. The broker application may mediate access to a wireless network supported by a wireless communication service provider other than the home service provider of the UE 102. At block 304, a network access key is installed by the broker application into the trusted security zone of the UE for the wireless network, wherein the broker application executes in the trusted security zone. For example, the broker application may be installed in the trusted security zone 104 and a network access key may be installed by the broker application into the trusted security zone 104 for accessing the wireless network. The broker application may execute in the trusted security zone 104.

At block 306, responsive to receiving a rejection of an attach request to roam by the UE in the wireless network, credentials are presented by the broker application to the wireless network, wherein the credentials comprise the network access key. For example, when the UE 102 is in the vicinity of the wireless network, the UE 102 may receive a rejection to an attach request to roam with the wireless network, for example a rejection to an attach request to roam with the wireless network through the home service provider. This may be because that the UE 102 has been configured not to roam with the wireless network through its home service provider. The UE 102 has not been configured not to roam with the wireless network directly though. When the UE 102 roams directly with the wireless network, the UE 102 may be billed by the wireless network directly. The broker application may provide credentials comprising the installed network access key that is associated with the wireless network to a wireless communication service server. The wireless communication service server may be supported by the wireless communication service provider.

At block 308, the network access key presented by the UE 102 is examined by the wireless communication service provider server. At block 310, responsive to the network access key being validated based on the examining results, network access of the wireless network is granted by the wireless communication service provider server to the UE 102. After the UE 102 is granted access to the wireless network, communication service consumption associated with the wireless network may be monitored by the witness application 106 and stored in the trusted security zone 104. Furthermore, the monitored communication service consumption may be reported to the wireless communication service provider server via a trusted end-to-end communication channel. A payment method may have been stored in the trusted security zone 104 when the broker application was installed on the UE 102. The payment method may be used for wireless network service consumption associated with the wireless communication service provider.

Figure 4:
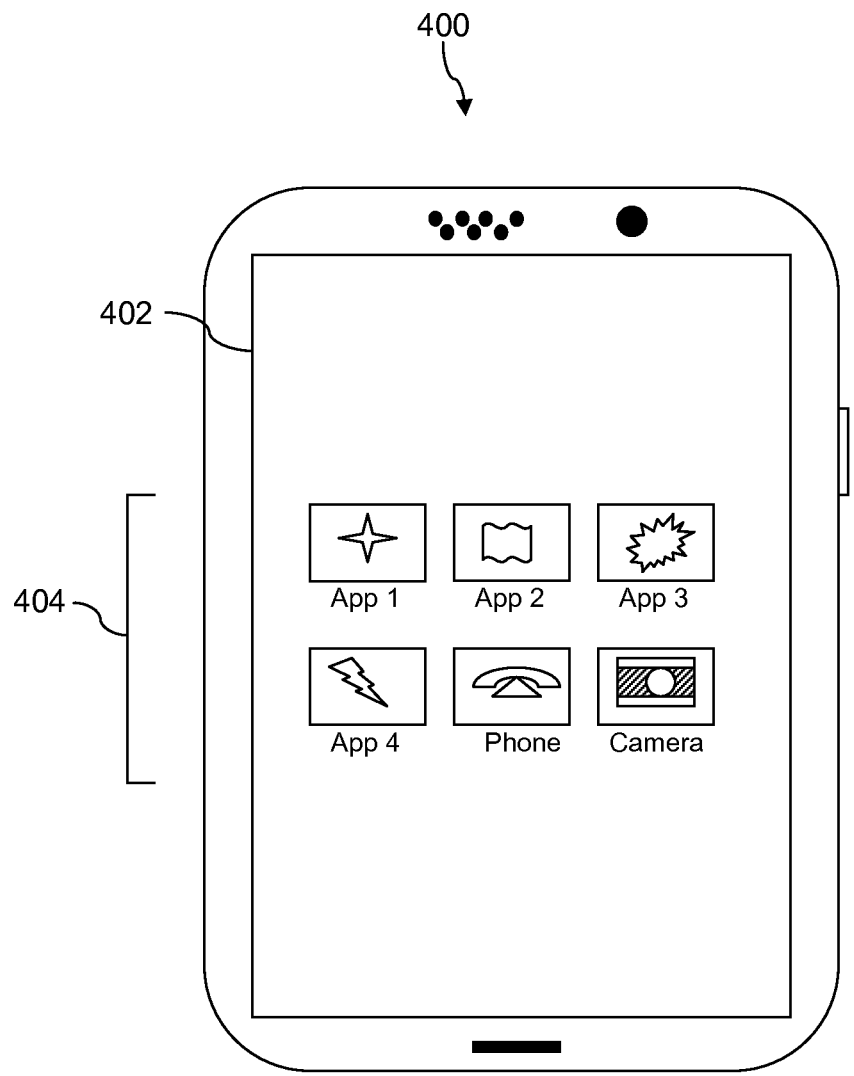
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
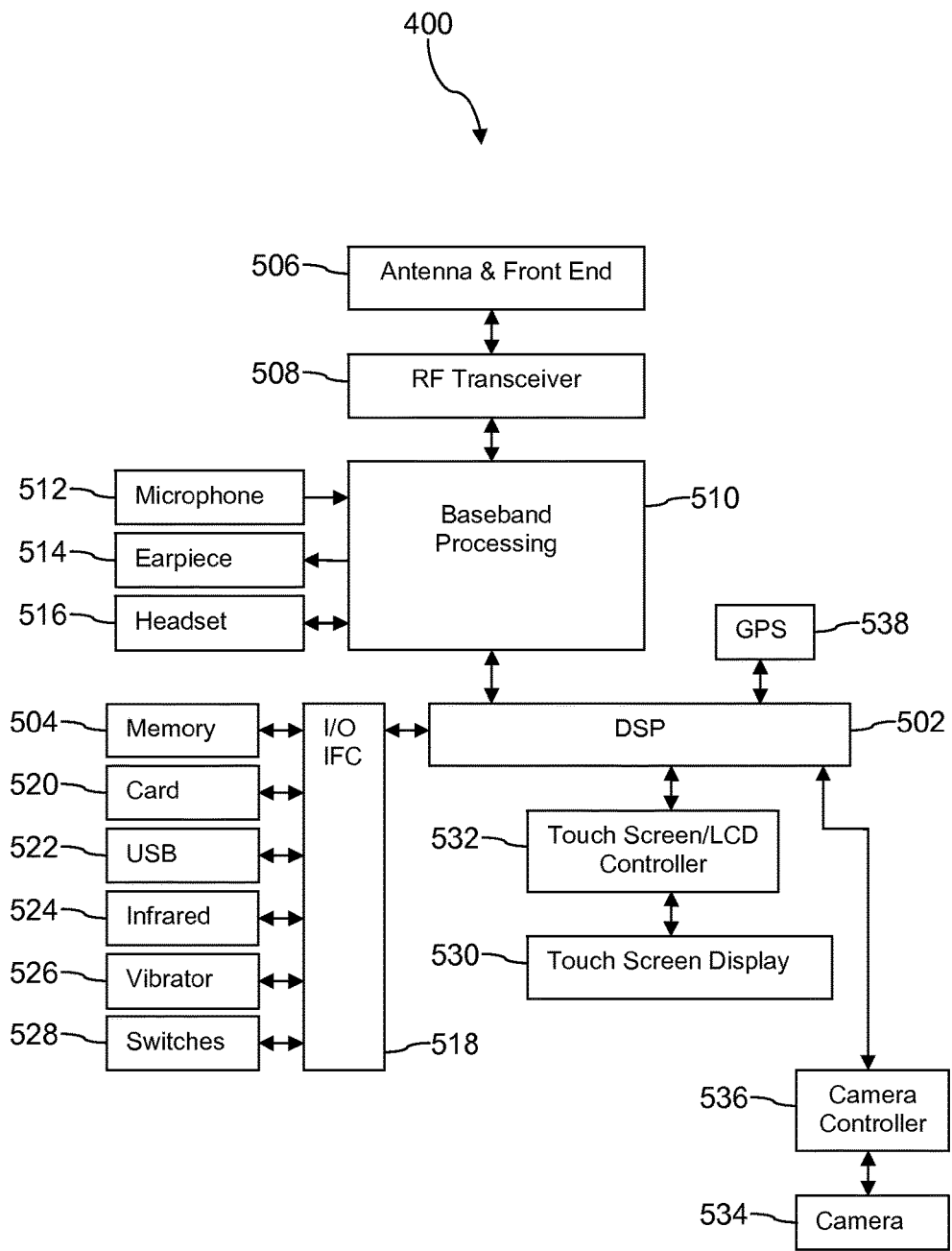
FIG. 5 is a block diagram of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
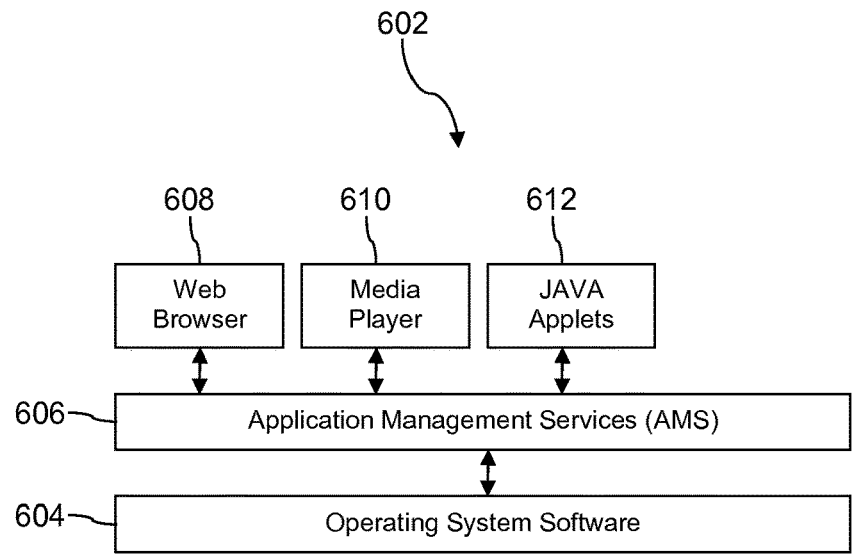
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
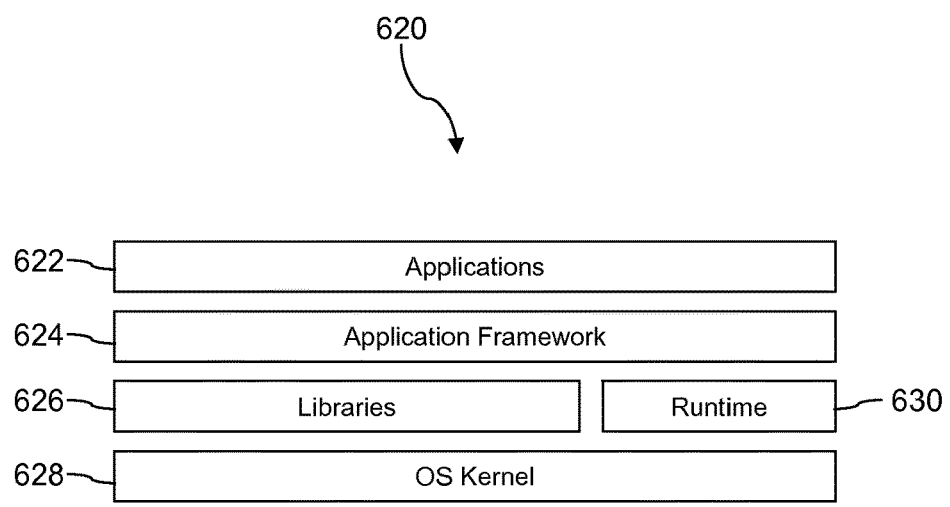
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
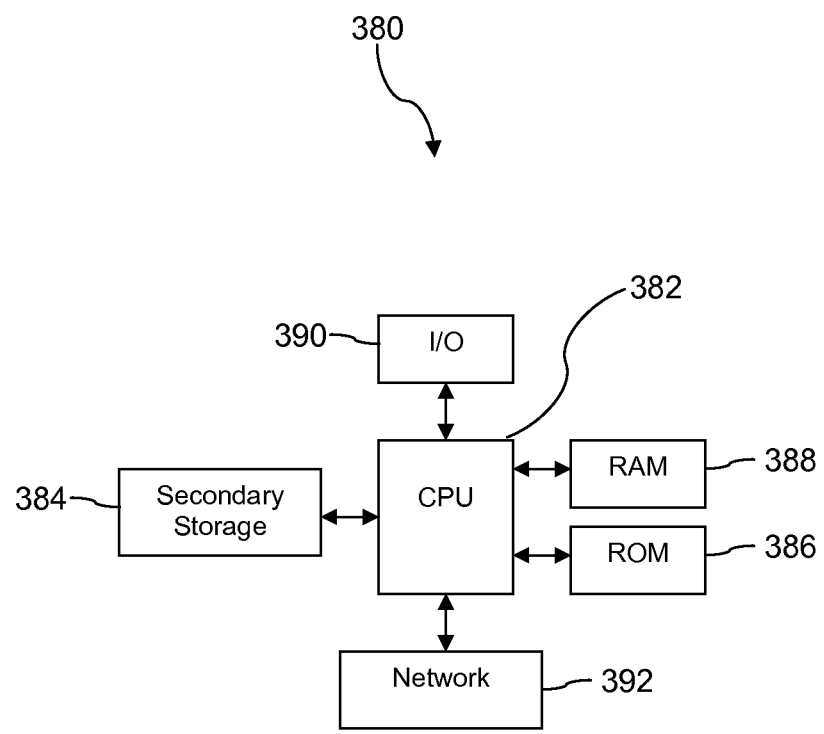
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment with a primary identifier and a secondary identifier, comprising:
   a memory;
   a processor; and
   a witness application stored in the memory, that when executed by the processor in a trusted security zone, wherein the trusted security zone provides hardware assisted trust,
   monitors communication service consumption of a plurality of different communication services associated with each of the primary identifier and the secondary identifier of the user equipment,
   stores a plurality of logs of communication service consumption differentiated by identifier in the trusted security zone, and
   transmits a message comprising the logs of the communication service consumption to a server in a network of a service provider associated with the user equipment using a trusted end-to-end communication channel, wherein the logs are translated by the server to a format compatible with a billing data store supported by a billing server, wherein the translated logs are transmitted to the billing data store, wherein a bill is created for each of the primary identifier based on the monitored communication service consumption of the plurality of different communication services associated with the primary identifier and the secondary identifier based on the monitored communication service consumption of the plurality of different communication services associated with the secondary identifier by the billing server accessing the billing data store.

2. The user equipment of claim 1, wherein the identifier is one of a phone number, a uniform resource identifier (URI), or a uniform resource locator (URL).

3. The user equipment of claim 1, wherein the message comprising the logs of the communication service consumption is transmitted to the server using the trusted end-to-end communication channel periodically.

4. The user equipment of claim 3, wherein the message comprising the logs of the communication service consumption is transmitted to the server every time communication services are used, every day, every week, every month, or every two months.

5. The user equipment of claim 3, wherein non-network related activity is monitored by the witness application.

6. The user equipment of claim 5, wherein the non-network related activity is transmitted in the message comprising the communication service consumption to the server for billing purposes using the trusted end-to-end communication channel.

7. The user equipment of claim 1, wherein the secondary identifier is deposited to the user equipment via the trusted security zone.

8. The user equipment of claim 7, wherein a service order code (SOC) is assigned to the secondary identifier.

9. A method of collecting communication service consumption information associated with a primary identifier and a secondary identifier of a user equipment (UE), comprising:
   monitoring, by a witness application that executes in a trusted security zone of the UE, communication service consumption of a plurality of different communication services associated with each of the primary identifier and the secondary identifier of the UE, wherein the trusted security zone provides hardware assisted trust;
   storing a plurality of logs of communication service consumption differentiated by identifier in the trusted security zone; and
   transmitting a message comprising the logs of the communication service consumption over a trusted end-to-end communication channel to a server in a network of a service provider associated with the UE, wherein the logs are translated by the server to a format compatible with a billing data store supported by a billing server, wherein the translated logs are transmitted to the billing data store, wherein a bill is created for each of the primary identifier based on the monitored communication service consumption of the plurality of different communication services associated with the primary identifier and the secondary identifier based on the monitored communication service consumption of the plurality of different communication services associated with the secondary identifier by the billing server accessing the billing data store.

10. The method of claim 9, wherein the UE is one of a smart phone, a laptop computer, a notebook computer, a tablet computer, a personal digital assistant (PDA), a media player, a headset computer, a wearable computer, a game console, an Internet digital media streaming device, a television, a set top box, a portable storage device, a hotspot, a 2.5 Wi-Fi translator, an Internet of Things (IoT) device, or another network/communications capable device.

11. The method of claim 9, wherein the UE establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

12. The method of claim 9, wherein the identifier is one of a phone number, a uniform resource identifier (URI), or a uniform resource locator (URL).

13. The method of claim 9, wherein the message comprising the logs of the communication service consumption is transmitted to the server using the trusted end-to-end communication channel periodically.

14. The method of claim 13, wherein non-network related activity is monitored by the witness application.

15. The method of claim 9, wherein the secondary identifier is deposited to the user equipment via the trusted security zone.

16. The method of claim 9, wherein a service order code (SOC) is assigned specifically to the secondary identifier.

17. A method of providing wireless communication service to a user equipment (UE) from a foreign wireless network supported by a foreign wireless communication service provider that is different from a home wireless network that is supported by a home service provider of the UE, comprising:
   attempting by the UE to register to roam on the foreign wireless network;
   receiving a denial message by the UE, where the denial message denies roaming on the foreign wireless network by the UE and comprises a link to a broker application that mediates access to the foreign wireless network;
   downloading from the link in the denial message, by a trusted application on the UE, the broker application, wherein the trusted application executes in a trusted security zone of the UE, wherein the trusted security zone provides hardware assisted trust;
   installing, by the broker application, a network access key into the trusted security zone of the UE for the foreign wireless network, wherein the broker application executes in the trusted security zone;
   presenting, by the broker application, credentials to the foreign wireless network, wherein the credentials comprise the network access key;
   examining, by a foreign wireless communication service provider server, the network access key presented by the UE; and
   responsive to the network access key being validated based on the examining results, granting, by the foreign wireless communication service provider server, network access of the foreign wireless network to the UE.

18. The method of claim 17, wherein the user equipment is one of a smart phone, a laptop computer, a notebook computer, a tablet computer, a personal digital assistant (PDA), a media player, a headset computer, a wearable computer, a game console, an Internet digital media streaming device, a television, a set top box, a portable storage device, a hotspot, a 2.5 Wi-Fi translator, an Internet of Things (IoT) device, or another network/communications capable device.

19. The method of claim 17, wherein payment information is provided to the foreign wireless communication service provider via the broker application when the broker application is downloaded.

20. The method of claim 17, further comprising monitoring communication service consumption associated with the foreign wireless network and reporting the monitored communication service consumption to the foreign wireless communication service provider server.

* * * * *